Dec. 14, 1965 W. W. HOLL, JR., ETAL 3,223,486
APPARATUS FOR TREATMENT OF SOLIDS FOR ANALYSIS
Filed Sept. 12, 1962 2 Sheets-Sheet 1

INVENTORS
WALTER WINFIELD HOLL, JR.
RICHARD WIEGMANN WALTON
BY
Harry Cole
ATTORNEY INVENTORS
WALTER WINFIELD HOLL, JR.
RICHARD WIEGMANN WALTON
BY Harry Cole
ATTORNEY

United States Patent Office 3,223,486
Patented Dec. 14, 1965

3,223,486
APPARATUS FOR TREATMENT OF SOLIDS
FOR ANALYSIS
Walter Winfield Holl, Jr., Palmyra, N.J., and Richard
Wiegmann Walton, Langhorne, Pa., assignors, by mesne
assignments, to Technicon Instruments Corporation,
Chauncey, N.Y., a corporation of New York
Filed Sept. 12, 1962, Ser. No. 223,109
7 Claims. (Cl. 23—253)

This invention relates to the treatment of solids, especially tablets, for quantitative analysis in respect to a known ingredient thereof.

The primary object of the invention is the provision of a method and apparatus for automatically treating a series of samples of solids one after the other, in succession, to prepare them for analysis in respect to a known ingredient thereof and to concurrently transmit the treated samples in succession to an automatic analysis apparatus.

The above and other objects, features and advantages of the invention will be more clearly understood from the following description of the invention considered in connection with the accompanying illustrative drawings of an embodiment of the invention.

According to the invention, briefly described, a predetermined quantity of the solid material, which is to be treated and quantitatively analyzed with respect to a known ingredient thereof, is introduced into a container into which a predetermined quantity of a carrier liquid is also introduced. The carrier liquid and material are mixed together to form a liquid in the container having the solid material homogeneously distributed throughout the liquid as a constituent thereof, in the form of a suspension or solution, depending upon the type of material undergoing analysis. A predetermined quantity of the constituent-containing liquid is withdrawn from the container, in the form of a stream, and the stream is treated, during its flow, for analysis in respect to said ingredient. The treated stream is thereafter analyzed during its flow to provide a measurement of the quantity of the ingredient in the material. Any remaining liquid in the container is removed before the introduction of a successive quantity of solid material and carrier liquid, and the operation of the apparatus is repeated for the treatment and analysis of successive quantities of solid material.

Figure 2:
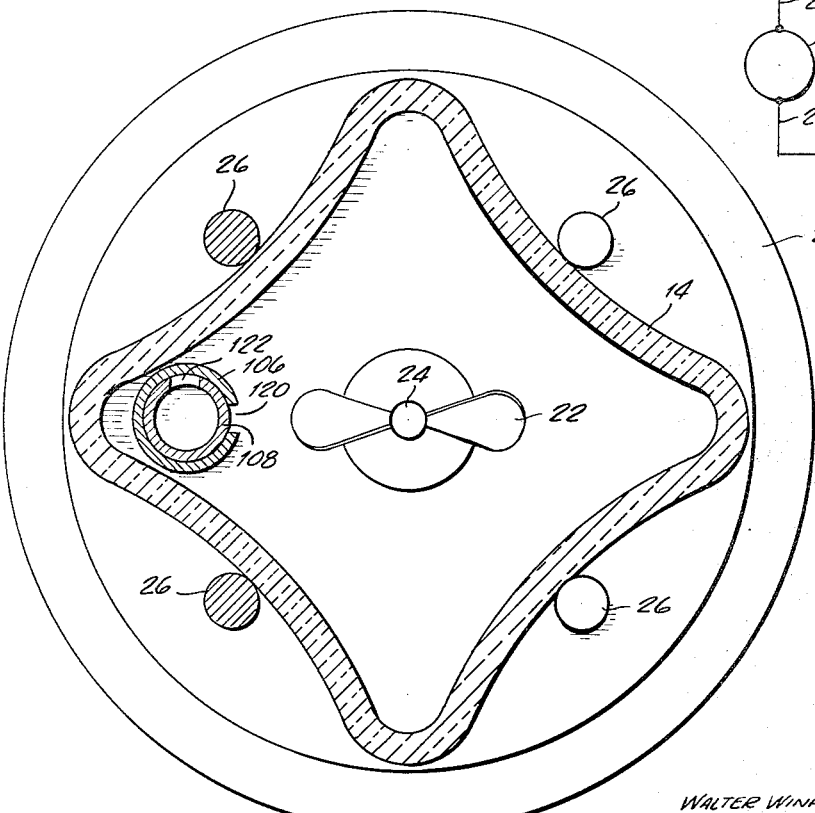
FIG. 2 is a top plan sectional view, on a larger scale, taken on line 2—2 of FIG. 1.

Referring now to the drawings in detail, the apparatus comprises a supply device 10 for solid material, herein illustrated as a tablet dispensing machine which feeds predetermined quantities of solid material, in the form of tablets, in succession, to a chute 12 for introduction of the solid material into a container 14 for a carrier liquid which is introduced into the container through an inlet tube 16. Both the chute and inlet tube are supported on a cover 18 of the container and the container is supported on a base 20 which houses a motor (not shown) for operating a mixer 22 which extends upwardly from the bottom of the container. The drive shaft of the motor is operatively connected to the rotary shaft 24 of the mixer by a coupling (not shown), and it will be understood that the shaft of the mixer extends below the bottom of the container for engaging the drive shaft of the motor. The container is preferably made of glass and, in cross section as illustrated by FIG. 2, has the lobular form indicated to prevent swirling of the liquid during the mixing operation, whereby the solid material is homogeneously distributed throughout the carrier liquid as a result of the mixing operation. A series of retaining pins 26 extend upwardly from the base and engage the sides of the container for releasably holding the container in position on its base.

Figure 1:
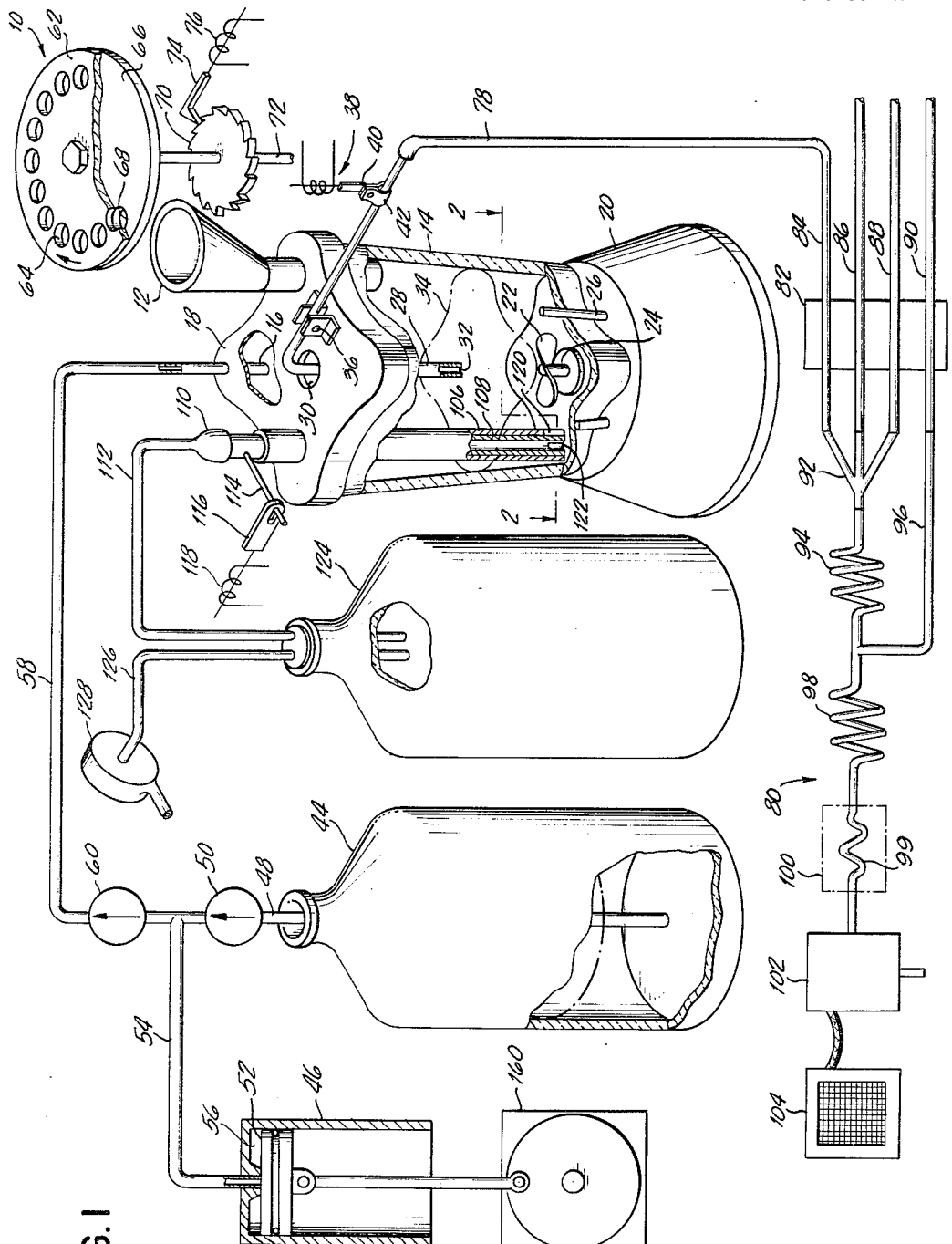
FIG. 1 is a combined diagrammatic and perspective illustration of the method and apparatus of the present invention.

A liquid take-off tube 28 extends through an opening 30 provided in the cover, and in the inoperative position of the tube, its inlet end 32 is above the level 34 of the liquid in the container. The take-off tube is pivotally mounted to the cover at 36 for movement downwardly into an operative position with its inlet end below the level of the liquid for withdrawing a predetermined quantity thereof from the container, and for movement upwardly into inoperative position above the level of the liquid in the container, as illustrated in FIG. 1. To effect the foregoing movement, the take-off tube is operated by a solenoid 38 and the plunger 40 of the solenoid is connected, at 42, to the part of the take-off tube which extends laterally from the container.

Predetermined quantities of the carrier liquid, which may be a solvent for the solid material or which may be a vehicle for carrying the solid material, in the form of minute particles suspended in the liquid, is supplied from a reservoir 44 through the operation of a piston-type metering pump 46. A supply conduit 48 extends into the liquid in the reservoir and a check valve 50 is provided in the supply conduit to permit flow of the carrier liquid in the indicated direction during the intake stroke of the piston 52 of the pump, so that a predetermined quantity of carrier liquid is withdrawn from the reservoir and flows through conduit 54 into chamber 56 of the pump. Upon the delivery stroke of the pump, the same quantity of carrier liquid is transmitted through conduit 54 into a conduit 58 which is connected to inlet tube 16 for introducing the liquid into container 14. A check valve 60 is provided in conduit 58 to permit flow only in the direction indicated by the arrow. It will be understood that metering pump 46 is of the type that can be adjusted to deliver different predetermined quantities of liquid to container 14 during an operating cycle of the pump.

The tablet dispensing machine 10 comprises a circular rotary plate 62 or turntable having a circular row of holes 64 along the outer edge of the plate which form a series of receptacles closed at their bottoms by plate 66 on which plate 62 is superimposed. Said plate 66 is stationary and has a single hole 68 through which the individual tablets are dispensed, individually and in succession, into the chute 12, and it is to be understood that individual tablets are placed in each receptacle 64 and are supported therein by the upper surface of plate 66. Upper plate 62 is rotated intermittently for positioning each receptacle 64 in registry with hole 68 for dispensing of the tablets individually and in succession into the container 14 during spaced intervals of time. The intermittent movement of plate 62 is provided by a ratchet wheel 70 secured to a shaft 72 which extends through the lower plate 66 and is connected to the upper plate 62. The ratchet wheel is operated by a pawl 74 which is connected to the plunger of a solenoid 76 for operating the pawl and ratchet wheel to intermittently rotate the upper plate 62.

The outlet end of take-off tube 28 is connected to a conduit 78 for transmission of the withdrawn liquid from the container, in the form of a stream, to an automatic analysis apparatus 80 of the type shown and described in U.S. Patent No. 2,797,149, issued June 25, 1957. Briefly described, the analysis apparatus comprises a proportioning pump 82, preferably of the type shown in U.S. Patent No. 2,935,028, issued May 6, 1960. The pump has a series of resiliently flexible pump tubes 84, 86, 88 and 90 which are simultaneously engaged by a series of tube collapsing rollers which are movable longitudinally of the tubes for the pumping operation. Pump tube 84 is a suction tube and is connected to conduit 78 for withdrawing predetermined quantities of liquid from the container through take-off tube 28, by aspiration, and the withdrawn liquid, in the form of a stream, is transmitted to fitting 92, where it joins a stream of air supplied to pump tube 84 and a stream of a liquid reagent supplied to pump tube 88. As described in the above mentioned U.S. Patent No. 2,797,149, the air introduced through pump tube 86 segmentizes the liquid and forms a liquid stream comprising a series of longitudinally spaced liquid segments, each containing a portion of the liquid withdrawn from the container and a portion of the reagent introduced through pump tube 88, separated from each other by an intervening air segment. The function of the air segments is to wipe the internal walls of the passages of the apparatus clean and help prevent contamination of one liquid segment due to deposits of material from a preceding liquid segment. The liquid reagent which is transmitted through pump tube 88 is of a type that reacts with the ingredient of the solid material to form a reaction product in a quantity corresponding to the quantity of the ingredient in the solid material and the reaction product is of a type that can be treated for colorimetric analysis.

The segmented stream is transmitted to a horizontal helical mixing coil 94 where the constituents of each liquid segment are mixed together to form said reaction product. A color-producing reagent is supplied to pump tube 90 and is transmitted by the action of the pump through conduit 96 where it joins the segmented stream from mixing coil 94. The resulting stream is transmitted to another mixing coil 98 for the mixing of the color producing reagent with the liquid of each liquid segment whereby a color is formed having an intensity corresponding to the quantity of the reaction product in the liquid of the stream. The color treated segmented liquid is transmitted through a coil 99 immersed in a heating bath 100 which helps complete the color reaction. The colored stream is transmitted from the heating bath to a colorimeter 102 which measures the intensity of the color of the stream and the results of the colorimetric examination are recorded on a recorder 104.

The apparatus includes means for removing any remaining liquid from container 14 between successive introductions of solid material and carrier liquid into the container. More particularly, a stationary tube 106, preferably of glass, is supported from cover 18 of the container and extends downwardly into the container and terminates at the bottom of the container. Another tube 108 is nested within tube 106, in very close relation therewith, and is mounted for rotation about its longitudinal axis within tube 106. For this purpose, the upper end of inner tube 108 extends above the upper end of the outer tube 106, and the upper end of the inner tube is mounted for rotation in a fluid-tight socket 110 to which a conduit 112 is connected. An arm 114 extends from the side of the inner tube 106, at the upper end thereof, and the arm is operatively connected to a slotted member 116 that is connected to the plunger of an operating solenoid 118. The lower end of the outer tube 106 is provided with an opening 120 which is in communication with the interior of container 14 and, except for this opening, the bottom of tube 106 is in fluid-tight relation with the bottom of the container. The inner tube 108 is also provided with an opening 122 and the positions of openings 122 and 120 are normally at right angles to each other so that the inner tube is normally not in communication with the interior of the chamber The outlet end of conduit 112 is in fluid communication with a closed liquid receiver 124. A suction tube 126 has its inlet end in fluid communication with the interior of receiver 124, and the other end of the suction tube is connected to a vacuum pump 128 which is operating continuously to maintain a vacuum in receiver 124 for removing any remaining liquid in container 14 between successive introductions of solid material and carrier liquid into the container. More particularly, since opening 122 in inner tube 108 is closed in the position shown, which is the de-energized position of solenoid 118, the vacuum in tube 108 is not in communication with the interior of container 14 and no liquid can be withdrawn from the container through tube 108. When the solenoid is energized, the movement of the solenoid plunger results in the rotation of the inner tube about its longitudinal axis so that openings 120 and 122 are in registry with each other whereby the vacuum of the inner tube is in communication with the interior of container 14 and any liquid therein is withdrawn from the container and flows into the receiver 124.

Figure 3:
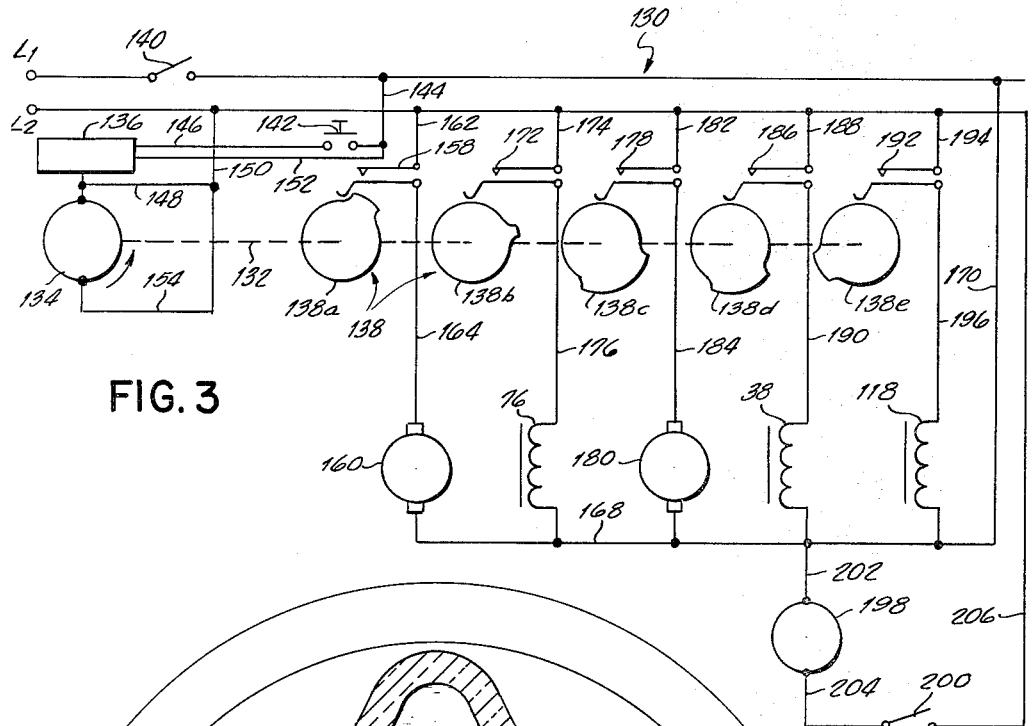
FIG. 3 is a wiring diagram illustrating the electrical controls of the apparatus.

The operation of the apparatus is controlled by a programmer 130 (FIG. 3) which operates the various parts of the apparatus to effect an operating cycle as follows:

Metering pump 46 is operated to introduce a metered quantity of the carrier liquid into container 14. The tablet dispensing machine 10 is operated to dispense a single tablet into the container. The mixer 22 is then operated to mix the carrier liquid and tablet together whereby the tablet is either dissolved in the carrier liquid or is homogeneously dispersed throughout the carrier liquid as a fine suspension therein. After the mixing operation, the take-off tube 28 is moved into operative position with its inlet end 32 below the level 34 of the liquid, and since pump 82 is operating continuously, a portion of liquid is aspirated from the container during the immersion of the tube in the liquid and, obviously, the quantity withdrawn depends upon the length of time the tube is immersed in the liquid and the pumping rate of the pump. The withdrawn liquid, in the form of a stream, is thereafter transmitted through the analyzer apparatus 80 for analysis, and the take-off tube 28 is removed from the liquid to end the withdrawing operation. The inner tube 108 is then rotated, by the action of solenoid 118, for removing any remaining liquid from the container to empty it, at which time the apparatus is in position for a repetition of the cycle for analysis of another and succeeding tablet. The operating cycle is again repeated, in the manner just described, as many times as desired, or as required, as determined by the programmer 130.

Briefly described, the programmer comprises a rotary cam shaft 132 operated by a motor 134 which is controlled by a timer 136 of any suitable type. A series of cams 138 are provided on the cam shaft for determining and controlling the sequence of operations indicated above. The operation of the apparatus, as controlled by the programmer, will now be described in detail.

To start the operation of the apparatus, switch 140 is closed to energize the power lines $L_1$ and $L_2$. The timer 136 is set for any number of operating cycles of the cam operating motor 134 and the push button 142 is momentarily closed to energize the timer 136 through line $L_1$, lead 144, push button 142, lead 146, timer 136, lead 148, lead 150 and line $L_2$ Release of push button 142 does not de-energize the timer since, upon closing of said push button, an energization holding circuit is completed through the timer via leads 144 and 152. Motor 134 is also energized through the timer via line $L_1$, lead 144, lead 152, timer 136, leads 154 and 150, and line $L_2$. Upon rotation of shaft 132, cam 138a closes the contacts of normally open switch 158 to complete an energization circuit to the motor 160 of metering pump 46 via line $L_2$, lead 162, now closed contacts of switch 158, lead 164, motor 160, lead 168, lead 170 and line $L_1$. After a predetermined quantity of carrier liquid is introduced into container 14 as determined by the rise on cam 138a, the contacts of switch 158 open and the operation of pump 146 stops.

Thereafter, the normally open contacts of switch 172 are closed by the action of cam 138b to complete an energization circuit through the coil of solenoid 76 for operating the tablet dispensing machine to dispense a tablet into the container through the chute 12. The energization circuit for solenoid 76 is from line $L_2$, lead 174, now closed switches of switch 172, lead 176, the coil of solenoid 76, leads 168 and 170, and line $L_1$.

After completion of the indexing movement of the tablet dispensing machine 10, the contacts of switch 172 are opened, as determined by the position of cam 138b, and cam 138c closes the normally open contacts of switch 178 to complete an energization circuit to the motor 180 which operates the mixer 22. The energization circuit for the motor can be traced as follows: line $L_2$, lead 182, now closed contacts of switch 178, lead 184, motor 180, leads 168 and 170, and line $L_1$. After a predetermined mixing period, as determined by the cam, the contacts of switch 178 open to de-energize motor 180 and stop the mixing operation.

Normally open contacts of switch 186 are then closed by the action of cam 138d to complete an energization circuit through the coil of solenoid 38 to move the take-off tube 28 into operative position for withdrawing a predetermined quantity of the mixed liquid from container 14. The energization circuit for solenoid 38 can be traced as follows: line $L_2$, lead 188, the now closed contacts of switch 186, lead 190, the coil of solenoid 38, leads 168 and 170, and line $L_1$. The take-off tube remains in the liquid for a predetermined period of time, as determined by the cam, and at the end of the withdrawing period, the contacts of switch 186 open to de-energize solenoid 38 causing the take-off tube to move out of the liquid. It is to be noted that in the inoperative position of the take-off tube, the inlet end 32 of the tube is exposed to air, and since the proportioning pump 82 is operating continuously, air is aspirated through said inlet end between successive withdrawals of liquid from the container, so that successive quantites of liquid are separated from each other by intervening quantities of air. In this manner the stream transmitted to the analysis apparatus 80 comprises a series of longitudinally spaced liquid samples from container 14, each separated from each other by an air segment.

After the withdrawal operation, the normally open contacts of switch 192 are closed by the action of cam 138e to complete an energization circuit to the coil of solenoid 118 to commence the removal of any remaining liquid from container 14. The energization circuit for the coil of solenoid 118 can be traced as follows: line $L_2$, lead 194, now closed contacts of switch 192, lead 196, the coil of solenoid 118, leads 168 and 170, and line $L_1$. At the completion of the liquid removal operation, the solenoid is de-energized by the opening of the contacts of switch 192, as provided by cam 138e, and tube 108 is returned to the position shown in FIG. 1. In this regard, it is to be understood that all the plungers of the solenoids are spring biased into an inoperative position so that upon de-energization of the solenoid, the plunger returns to its inoperative position under the biasing force of its spring. At the completion of the liquid removal operation, the apparatus has completed a cycle of operation and is in position for repetition of the cycle which may be repeated as determined by the setting of the timer 136.

Motor 198 which continuously operates vacuum pump 128 is energized through a switch 200 as follows: line $L_1$, leads 170 and 168, lead 202, motor 198, lead 204, switch 200, lead 206, and line $L_2$.

While we have shown and described the preferred embodiment of our invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

We claim:

1. Apparatus for treating quantities of solid material for analysis, comprising a mixing container; first means for introducing a predetermined quantity of material into said container during each of successive periods; second means for introducing a predetermined quantity of liquid into said container during each of the successive periods; mixer means operable within said container for mixing the material with the liquid therein, to form a liquid containing the material as a constituent thereof, during each of the successive periods; third means operable only between the successive periods, in fluid flow communication with said container, for withdrawing the material containing liquid from said container; and programming means coupled to said first means, said second means, said mixer means and said third means for sequentially and cyclically operating these means.

2. Apparatus for treating quantities of solid material for analysis, comprising a mixing container for a carrier liquid and the material; first means for introducing a predetermined quantity of material into said container during each of successive periods; second means for introducing a predetermined quantity of liquid into said container during each of the successive periods; mixer means operable within said container for mixing the material with the liquid therein, to form a liquid containing the material as a constituent thereof, during each of the successive periods; third means operable only between the successive periods, in fluid flow communication with said container, for withdrawing a portion of the material containing liquid from said container; fourth means operable only between the successive periods and subsequent to the operation of said third means for removing all liquid from said container, whereby said container is emptied prior to the commencement of each period; and programming means coupled to said first means, said second means, said mixer means, said third means and said fourth means for sequentially and cyclically operating these means.

3. Apparatus for treating quantities of solid material comprising a mixing container; first means for introducing a predetermined quantity of material into said container during each of successive periods; second means for introducing a predetermined quantity of liquid into said container during each of the successive periods; mixer means operable within said container during each of the successive periods for mixing the material with the liquid therein, to form a liquid containing the material as a constituent thereof; a take-off tube means mounted for movement to and from a liquid take-off position with respect to said container, for withdrawing as a fluid stream at least a portion of the material containing liquid from said container; additional means for moving said take-off tube means to and from said position; further means operable only between the successive periods for removing from said container all liquid not previously withdrawn by said take-off tube; and programming means coupled to said first means, said second means, said mixer means, said additional means, and said further means for sequentially and cyclically operating these means.

4. Apparatus for treating quantities of solid material for analysis, comprising a mixing container; first means for introducing a predetermined quantity of material into said container during each of successive periods; second means for introducing a predetermined quantity of liquid into said container during each of the successive periods; mixer means operable within said container during each of the successive periods for mixing the material with the liquid therein to form a liquid containing the material as a constituent thereof; third means operable only between the successive periods, in fluid flow communication with said container, for withdrawing at least a portion of the material containing liquid from said container; a stationary take-off tube means disposed in said container having a liquid inlet and a valve for said inlet both disposed at the lowermost point in said container for completely removing any liquid remaining in said container subsequent to the operation of said third means; and programming means coupled to said first means, said second means, said mixer means, said third means and said stationary take-off tube means for sequentially and cyclically operating these means.

5. Apparatus for treating quantities of solid material for analysis, comprising a mixing container; a turntable means for storing a plurality of tablets, each tablet comprising a predetermined quantity of material, dispensing means coupled to said turntable means for causing said turntable means to transfer one tablet into said container during each of successive periods; supply means for introducing a predetermined quantity of liquid into said container during each of the successive periods; mixer means operable within said container for mixing the tablet with the liquid therein, to form a liquid containing the material of the tablet as a constituent thereof, during each of the successive periods; take-off means operable only between the successive periods, in fluid flow communication with said container, for withdrawing a portion of the material containing liquid from said container; clean-out means operable only between the successive periods and subsequent to the operation of said take-off means for removing all liquid from said container, whereby said container is emptied prior to the commencement of each period; and programming means coupled to said dispensing means, said supply means, said mixer means, said take-off means, and said clean-out means for sequentially and cyclically operating these means.

6. Apparatus for treating quantities of solid material for analysis, comprising a container; supply means for introducing, seriatim, separate predetermined quantities of material and a carrier liquid into said container; said supply means including a carrier having a plurality of storing means, each for storing a predetermined quantity of material, a discharge station, first means for intermittently moving said carrier to position, seriatim, each storing means at said discharge station, second means for transferring material stored in a storing means positioned at said discharge station into said container, third means for introducing, seriatim, a predetermined quantity of the carrier liquid into said container, whereby said container is provided with a predetermined quantity of material together with a predetermined quantity of carrier liquid during each of successive periods; mixer means operable within said container for mixing the predetermined quantities of material and liquid therein to form a liquid containing the material as a constituent thereof; fourth means for removing at least a portion of the constituent containing liquid from said container; fifth means for removing any remaining constituent containing liquid from said container, and program means coupled to said supply means, said mixer means, said fourth means and said fifth means for sequentially and cyclically operating these means, whereby, cyclically, a predetermined quantity of material and a predetermined quantity of liquid are initially introduced into said container and mixed therein, subsequently at least a portion of the constituent containing liquid is removed from said container, and finally said container is emptied prior to the commencement of the next cycle.

7. Apparatus for analyzing quantities of solid material comprising treating means for treating a fluid stream for analysis with respect to a given constituent; analyzing means in fluid flow communication with said treating means for continuously analyzing a treated fluid stream therein; a mixing container; first means for introducing a predetermined quantity of material into said container during each of successive periods; second means for introducing a predetermined quantity of liquid into said container during each of the successive periods; mixer means operable within said container during each of the successive periods for mixing the material with the liquid therein, to form a liquid containing the material as a constituent thereof; third means operable only between the successive periods, in fluid flow communication with said container, for withdrawing a portion of the material containing liquid from said container as a segment of a fluid stream; fourth means operable only between the successive periods and subsequent to the operation of said third means for removing all liquid from said container, whereby said container is emptied prior to the commencement of each period; conduit means in fluid flow communication with said third means for receiving therefrom the segment of the fluid stream; programming means coupled to said first means, said second means, said mixed means, said third means and said fourth means for operating said means sequentially and cyclically to pass a fluid stream to said conduit means comprising a plurality of segments, each segment being a sample of a quantity of material; said treating means being in fluid flow communication with said conduit means for receiving the fluid stream therefrom.

References Cited by the Examiner

UNITED STATES PATENTS

| 2,176,232 | 10/1939 | Warren et al. | 222—360 X |
| 2,314,421 | 3/1943 | Peterson | 259—23 |
| 2,797,149 | 6/1957 | Skeggs | 23—230 |
| 2,838,378 | 6/1958 | Shawhan | 23—253 |
| 2,879,141 | 3/1959 | Skeggs | 23—253 |
| 2,899,280 | 8/1959 | Whitehead et al. | 23—230 |
| 2,953,440 | 9/1960 | Claudy | 23—253 |
| 3,010,800 | 11/1961 | Whitehead et al. | 23—253 |

MORRIS O. WOLK, *Primary Examiner.*

ANTHONY SCIAMANNA, DELBERT E. GANTZ,
*Examiners.*